United States Patent
Spry et al.

(10) Patent No.: US 8,332,549 B2
(45) Date of Patent: Dec. 11, 2012

(54) METHOD AND SYSTEM FOR IMPLEMENTING PARALLELISM WITH SCSI I/O REFERRALS

(75) Inventors: Andrew J. Spry, Wichita, KS (US); Ross Zwisler, Lafayette, CO (US); Gerald J. Fredin, Wichita, KS (US); Kenneth J. Gibson, Lafayette, CO (US)

(73) Assignee: LSI Corporation, Milpitas, CA (US)

( * ) Notice: Subject to any disclaimer, the term of this patent is extended or adjusted under 35 U.S.C. 154(b) by 359 days.

(21) Appl. No.: 12/384,001

(22) Filed: Mar. 31, 2009

(65) Prior Publication Data

US 2010/0250795 A1 Sep. 30, 2010

(51) Int. Cl.
*G06F 3/00* (2006.01)

(52) U.S. Cl. ........ 710/36; 710/37; 710/38; 710/39; 710/40; 710/41; 710/42; 710/43; 710/44; 710/45; 710/46; 710/47; 710/48; 710/49; 710/50; 710/51

(58) Field of Classification Search ............... None
See application file for complete search history.

(56) References Cited

U.S. PATENT DOCUMENTS

| | | | | |
|---|---|---|---|---|
| 6,105,122 A * | 8/2000 | Muller et al. | ...... | 712/1 |
| 7,281,062 B1 * | 10/2007 | Kuik et al. | ...... | 709/249 |
| 7,509,436 B1 * | 3/2009 | Rissmeyer | ...... | 709/249 |
| 7,839,788 B2 * | 11/2010 | Qi | ...... | 370/235 |
| 2003/0097607 A1 * | 5/2003 | Bessire | ...... | 714/5 |
| 2006/0005074 A1 * | 1/2006 | Yanai et al. | ...... | 714/5 |
| 2006/0031602 A1 * | 2/2006 | Ellis et al. | ...... | 710/22 |
| 2006/0056293 A1 * | 3/2006 | Kumagai et al. | ...... | 370/229 |
| 2007/0192554 A1 * | 8/2007 | Higaki et al. | ...... | 711/162 |
| 2008/0086618 A1 * | 4/2008 | Qi | ...... | 711/170 |
| 2011/0029732 A1 * | 2/2011 | Kobayashi et al. | ...... | 711/114 |

* cited by examiner

*Primary Examiner* — Henry Tsai
*Assistant Examiner* — Jing-Yih Shyu
(74) *Attorney, Agent, or Firm* — Suiter Swantz pc llo

(57) ABSTRACT

A method for communication between an initiator system and a block storage cluster may include receiving a first input/output (I/O) request from the initiator system. The method may also include sending a referral response from a first storage system included in a plurality of storage systems of the block storage cluster to the initiator system when data associated with the first I/O request is stored in more than one storage system of the plurality of storage systems of the block storage cluster. Additionally, the method may include directing a referral I/O to the first storage system and the second storage system for transferring data to or transferring data from the first storage system and the second storage system, and transferring data associated with the referral I/O to or transferring data associated with the referral I/O from the first storage system and the second storage system.

9 Claims, 4 Drawing Sheets

| Port | Starting LBA | Length |
|---|---|---|
| Port 0 | LBA 50 | 50 |
| Port 1 | LBA 100 | 50 |

600

610 Receive a first input/output (I/O) request from an initiator system

620 Send a referral response from a first storage system included in a plurality of storage systems of the block storage cluster to the initiator system when data associated with the first I/O request is stored in more than one storage system of the plurality of storage systems of the block storage cluster 630 Direct a referral I/O request to the first storage system and the second storage system for transferring data to or transferring data from the first storage system and the second storage system 640 Transfer data associated with the referral I/O request to or transferring data associated with the referral I/O request from the first storage system and the second storage system

*FIG. 6*

METHOD AND SYSTEM FOR IMPLEMENTING PARALLELISM WITH SCSI I/O REFERRALS

TECHNICAL FIELD

The present disclosure generally relates to the field of electronic data storage, and more particularly to methods and systems for implementing parallelism with Small Computer System Interface (SCSI) Input/Output (I/O) referrals.

BACKGROUND

Currently available systems/methods for transferring data to and from block storage clustering systems may not provide a desired level of performance.

SUMMARY

A method for communication between an initiator system and a block storage cluster may include receiving a first input/output (I/O) request from the initiator system. The first I/O request may associate data for transfer to or transfer from a storage location. The method may also include sending a referral response from a first storage system included in a plurality of storage systems of the block storage cluster to the initiator system when data associated with the first I/O request is stored in more than one storage system of the plurality of storage systems of the block storage cluster. The referral response may provide information for directing the initiator system to a second storage system storing data associated with the first I/O request. The second storage system may be included in the plurality of storage systems of the block storage cluster. Additionally, the method may include directing a referral I/O to the first storage system and the second storage system for transferring data to or transferring data from the first storage system and the second storage system, and transferring data associated with the referral I/O to or transferring data associated with the referral I/O from the first storage system and the second storage system.

A storage system may include means for receiving a first input/output (I/O) request from the initiator system. The first I/O request may associate data for transfer to or transfer from a storage location. The storage system may also include means for sending a referral response from a first storage system included in a plurality of storage systems of the block storage cluster to the initiator system when data associated with the first I/O request is stored in more than one storage system of the plurality of storage systems of the block storage cluster. The referral response may provide information for directing the initiator system to a second storage system storing data associated with the first I/O request. The second storage system may be included in the plurality of storage systems of the block storage cluster. Additionally, the storage system may include means for directing a referral I/O to the first storage system and the second storage system for transferring data to or transferring data from the first storage system and the second storage system, and means for transferring data associated with the referral I/O to or transferring data associated with the referral I/O from the first storage system and the second storage system.

A computer-readable medium may have computer-executable instructions for performing a method for communication between an initiator system and a block storage cluster, where the method may include receiving a first input/output (I/O) request from the initiator system. The first I/O request may associate data for transfer to or transfer from a storage location. The method may also include sending a referral response from a first storage system included in a plurality of storage systems of the block storage cluster to the initiator system when data associated with the first I/O request is stored in more than one storage system of the plurality of storage systems of the block storage cluster. The referral response may provide information for directing the initiator system to a second storage system storing data associated with the first I/O request. The second storage system may be included in the plurality of storage systems of the block storage cluster. Additionally, the method may include directing a referral I/O to the first storage system and the second storage system for transferring data to or transferring data from the first storage system and the second storage system, and transferring data associated with the referral I/O to or transferring data associated with the referral I/O from the first storage system and the second storage system.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 6 is a flow chart illustrating a method for communication between an initiator system and a block storage cluster of the present disclosure, in accordance with an exemplary embodiment of the present disclosure.

DETAILED DESCRIPTION

Reference will now be made in detail to the subject matter disclosed, which is illustrated in the accompanying drawings.

Figure 1:
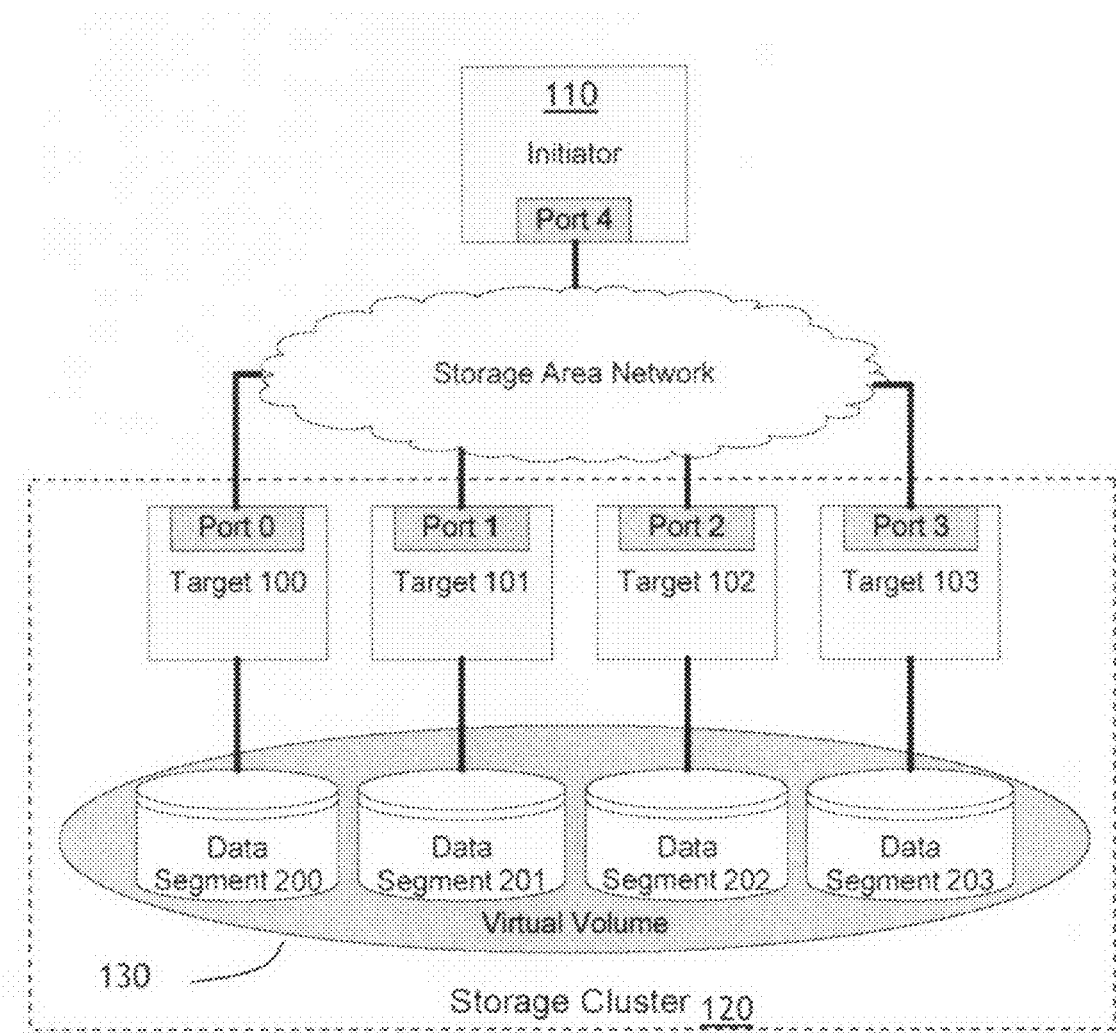
FIG. 1 is a networked storage implementation/system accessible via a block storage protocol in accordance with an exemplary embodiment of the present disclosure.
Figure 2:
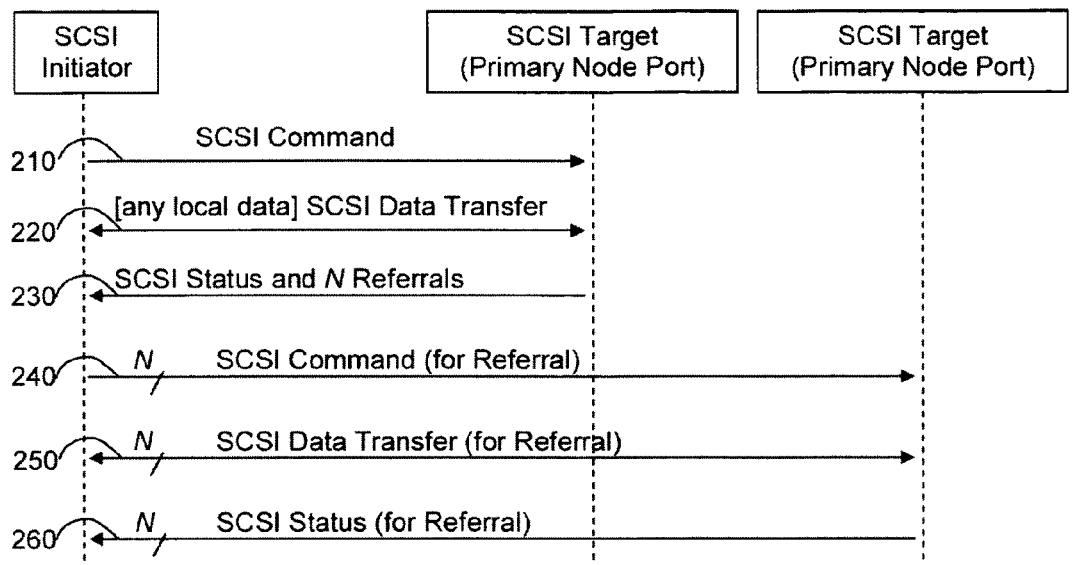
FIG. 2 is a block diagram of a SCSI command/response configuration with referral.

Referring to FIGS. 1 and 2, exemplary embodiments of SCSI referral configurations are shown. An initiator system 110 may be configured for accessing a block storage cluster 120 via a storage area network. Block storage cluster 120 may include a striped virtual volume 130, which may be formed by striping Data Segments 200, 201, 202, and 203. It may be appreciated that additional striping may be included, but not depicted in FIG. 1. Data Segments 200, 201, 202, and 203 may be accessible through Ports 0, 1, 2, and 3 on Target Devices 100, 101, 102, and 103, respectively. While the SCSI referral configuration shown in FIG. 1 is represented including a striped virtual volume 130, it may be appreciated that other configurations may be utilized, regardless of internal structure of the virtual volume 130. For instance, other suitable configurations may include volumes created by concatenation and any other suitable aggregation technique.

Small Computer System Interface (SCSI) Input/Output (I/O) referral techniques may be utilized to facilitate communication between an initiator system 110 and a block storage cluster 120. For example, the initiator system 110 (e.g., a data requester) may transmit a data request command 210 to a first storage system (e.g., target device 100 through port 0) included in a plurality of storage systems of the block storage cluster 120. When the data requested in the data request is stored in and/or accessible by the first storage system, the data may be retrieved and transferred 220. For instance, such a transfer may be from the initiator system 110 to the first storage system, or from the first storage system to the initiator system 110. However, when a portion of the data requested is not stored by the first storage system, but is stored by a second storage system (e.g., target device 101) included in the block storage cluster 120, a referral response may be transmitted 230 from the first storage system to the initiator system 110. The referral response may provide an indication, such as by a status indicator, to the initiator system 110 that not all of the requested data was transferred. The referral response may further provide information for directing the initiator system to the second storage system (e.g., accessing target 101 through port 1). A similar process may then occur between the initiator system 110 and any number of additional target devices. For instance, in FIG. 2, the SCSI initiator transmits a data request command 240 as indicated by the referral to secondary target node ports via the referral response. When the data requested in the data request is stored in the secondary targets, the data may be retrieved and transferred 250. A SCSI status may then be transferred 260. For example, the SCSI status may indicate that all data associated with the data request command 240 has been transferred or received.

SCSI I/O referral techniques may enable an initiator system to access data on Logical Unit Numbers (LUNs) that are spread across a plurality of storage/target devices. Such referral techniques may include those discussed by U.S. application Ser. No. 12/316,713, entitled "Small Computer System Interface Input Output (SCSI 10) Referral," filed Dec. 15, 2008, the disclosure of which is hereby incorporated by reference. Target devices may be disks, storage arrays, tape libraries, and/or other types of storage devices. It is understood that an I/O request may be a SCSI command, the first storage system may be a SCSI storage system, and the initiator system may be a SCSI initiator system. The SCSI command may identify the requested data by a starting address of the data and a length of the data in a volume logical block address space.

Near linear performance scaling may be a concern when accessing virtual volumes spread across a plurality of target devices. However, large amounts of SCSI I/O referrals may negatively impact performances. This issue may become more noticeable as virtual volumes may be spread across an increasing number of target devices. For instance, consider a case in which data segments may be striped evenly behind multiple target devices. A random I/O directed at any target device may need to be split and redirected whenever the direct I/O crosses a stripe boundary. In general, for an I/O request for L blocks of data to a virtual volume with a stripe length of S blocks, the probability of a split I/O is $(L-1)/S$ for L less than or equal to ($\leqq$) S and 1 for L greater than (>) S. Thus, the probability that an I/O to a random logical block address (LBA) needs to be redirected may be $(L-1)/S$ for L less than or equal to ($\leqq$) S and may be 1 for L greater than (>) S.

An initiator system capable of sending and accepting data out of order for a SCSI I/O may perform multiple parts of the I/O in parallel, such as, for example, when the distribution of data across multiple target devices is known. After a SCSI referral containing a list of data ranges on target devices has been returned from a target device, the remaining data may be accessed in parallel at the discretion of the initiator. However, the SCSI referral list is not provided until local data has been transferred to or from the target device which received the SCSI I/O request. This SCSI referral operation may result in a serialized initial step, resulting in an access serialization penalty associated with I/O redirection via SCSI referrals. The access serialization penalty may be reduced or eliminated according to various embodiments of the present disclosure. For instance, the target device may return a SCSI I/O referral list immediately (e.g., without data transfer) as the status of an I/O request even if the target device contains a portion of the data requested by the I/O. Specifically, data may be returned to the initiator system by the SCSI target device only if the target device has access to all of the data needed to satisfy the request. Otherwise, a referral list may be returned to the initiator system immediately. In the case where the referral list is returned immediately, the referral list may include an entry for any data segment which is local to the target device. Such a method/system is described in further detail below with reference to FIGS. 3-6.

Figure 3:
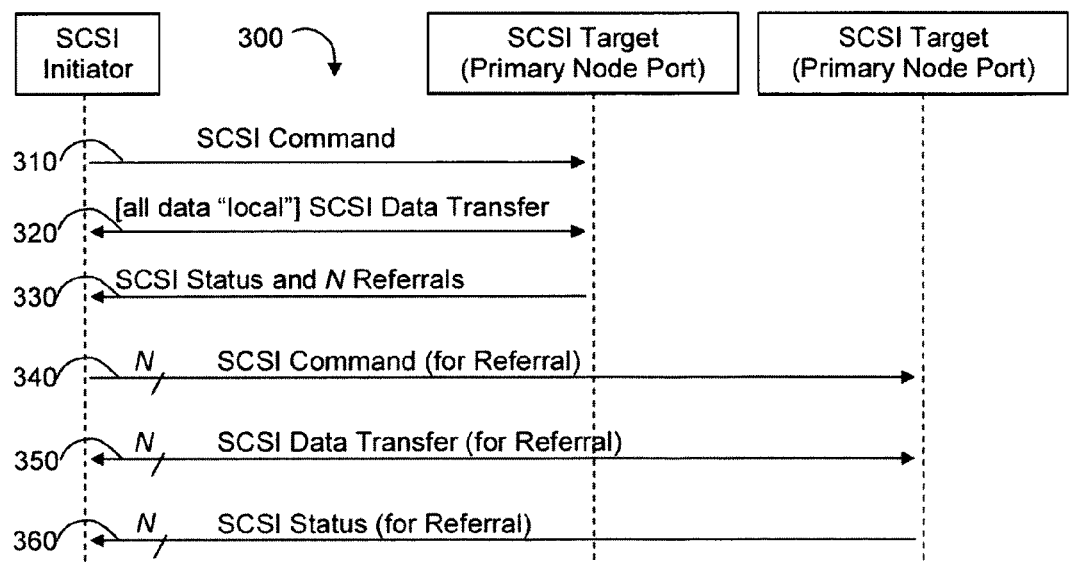
FIG. 3 is a block diagram of a SCSI command/response configuration with immediate referral.

Referring now to FIG. 3, a modified command, data transfer, and response sequence 300 of a SCSI I/O is shown. This embodiment of the present disclosure may utilize parallelism, among other properties, while reducing or eliminating the access serialization penalty. The initiator system 110 (e.g., a data requester) may transmit a data request command 310 to a first storage system (e.g., target device 100 through port 0, as shown in FIG. 1) included in a plurality of storage systems of the block storage cluster 120. When all of the data requested in the data request is stored in and/or accessible by the first storage system, the data may be retrieved and transferred 320. For instance, such a transfer may be from the initiator system 110 to the first storage system, or from the first storage system to the initiator system 110 based upon data transfer operations as dictated by the initiator system 110 as part of an initial I/O request, rather than as part of a referral I/O request. In such an instance, the data may be determined to be "all local," since the targeted device may store/access all of the requested data.

However, when a portion of the data requested is not stored and/or accessible by the first storage system, but is stored and/or accessible by a second storage system (e.g., target device 101 of FIG. 1) included in the block storage cluster 120, a referral response may be transmitted 330 from the first storage system to the initiator system 110. The referral response may provide an indication, such as by a status indicator, to the initiator system 110 that not all of the requested data was transferred. The referral response may further provide information for directing the initiator system to the second storage system (e.g., accessing target 101 through port 1 of FIG. 1). Such a referral may be deemed "immediate," as the first storage system provides the referral response without transfer of data associated in the data request, even though a portion of the data associated in the data request is stored in and/or accessible by the first storage system. The immediate referral list may reference any data local to the first storage system in addition to all remote data, such as data stored in and/or accessible by additional storage systems (e.g., the second storage system).

FIG. 3 may therefore depict two I/O scenarios: (1) a first scenario where all data is local; and (2) a second scenario where all data is not local. The first scenario may be demonstrated by steps 310, 320, and 330, where the command is transmitted to the primary target, the data associated with the command is transmitted, and a status indication is transmitted, which may indicate that all data associated with in the command has been transferred. The second scenario may be demonstrated by steps 310, 330, 340, 350, and 360. Step 320 is not performed in the second scenario where all data is not local, since the data transfer in step 320 is dependent upon all data being local. Thus, the (immediate) referral response sent in step 330 effectively concludes the command sent in step 310 and references data local to the primary target. A plurality of referral commands may then be sent to the secondary target node ports, including a command to the primary target for the portion of data local to the primary target.

Upon receiving the immediate referral from the first storage system, the initiator system 110 may then transmit a plurality of referral data request commands 340, as indicated by the referral, to secondary target node ports via the referral response. For instance, the initiator system may transmit an individual referral I/O request to each secondary target node port, referencing data to be accessed, such as via a starting LBA value and a length. Additionally, the plurality of referral data request commands may include a command directed to the primary target (e.g., the first storage system) for the portion of data local to the primary target, as indicated by the immediate referral response. For example, upon receiving an immediate referral response from the first storage system, the initiator system 110 may transmit in parallel a referral data request command to the first storage system and to any additional storage system which stores and/or can access data associated in the referral data request. When the data requested in the referral data request is stored in and/or accessible by the primary and secondary targets, the data may be retrieved and transferred 350. A SCSI status may then be transferred 360. For example, the SCSI status may indicate that all data associated with the referral data request command 340 has been transferred. In this manner, target transfers for data that resides on multiple target devices may be transferred in parallel by an initiator without waiting for completion of the first data segment transfer.

Figures 4, 5:
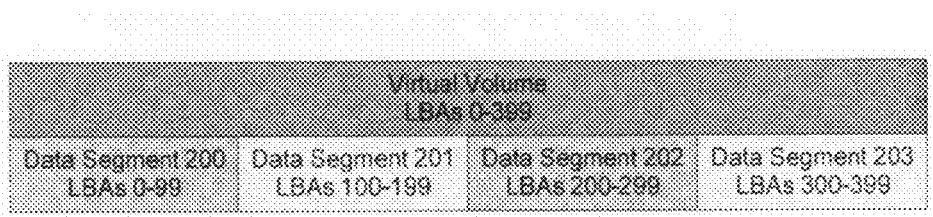
FIG. 4 is an illustration depicting a logical block access distribution for an exemplary virtual volume.
FIG. 5 is an illustration of an immediate referral Input/Output (I/O) list.

Referring now to FIG. 4, an illustration depicting a logical block access distribution for an exemplary virtual volume is displayed. Data Segments 200, 201, 202, and 203 are shown, such as those depicted in FIG. 1. In the embodiment shown in FIG. 4, each of the segments comprises a length of one hundred blocks. The combination of the four segments forms an LBA distribution of a first stripe for the virtual volume 130 of FIG. 1. Thus, the total virtual volume stripe comprises LBAs 0-399, wherein Data Segment 200 comprises LBAs 0-99, Data Segment 201 comprises LBAs 100-199, Data Segment 202 comprises LBAs 200-299, and Data Segment 203 comprises LBAs 300-399.

Referring now to FIG. 5, an illustration of an immediate referral Input/Output (I/O) list is displayed. As an example, an initiator system may transmit an I/O request for data located on LBA 50 through 149. This request may be sent to port 0 of target device 100, as shown in FIG. 1. With a standard I/O referral (i.e., referrals that are not immediate), LBAs 50 to 99 may be transferred before a SCSI response and I/O referral list are sent (such as shown by step 220 of FIG. 2). Then, under standard I/O referral, the initiator system may be required to issue a second I/O request for LBAs 100 to 149 to port 1 on target device 101. However, with immediate referral, when the first target device (e.g., the first storage system) receives the initial I/O request, the first target device sends a SCSI response immediately with two items in the referral list, such as shown in FIG. 5. Note that in this instance, target device 100 does not have access to all the data associated in the data request (LBA 50 through 149), and instead has access to only a portion of the data (LBA 50 through 99). Therefore an immediate referral may be necessary, as described above. Then, under immediate referral, the initiator system may send two referral I/O requests in parallel to port 0 and port 1 to retrieve the data associated in the initial I/O request.

FIG. 6 shows a flow diagram illustrating steps performed by a communication method 600 in accordance with the present disclosure. The method 600 may be utilized in a storage system for communication between an initiator system and a block storage cluster. Step 610 may receive a first input/output (I/O) request from an initiator system. The first I/O request may associate data for transfer to or transfer from a storage location.

Step 620 may send a referral response from a first storage system included in a plurality of storage systems of the block storage cluster to the initiator system when data associated with the first I/O request is stored in more than one storage system of the plurality of storage systems of the block storage cluster. The referral response may provide information for directing the initiator system to a second storage system storing data associated with the first I/O request. The second storage system may be included in the plurality of storage systems of the block storage cluster.

Step 630 may direct a referral I/O request to the first storage system and the second storage system for transferring data to or transferring data from the first storage system and the second storage system. Step 640 may transfer data associated with the referral I/O request to or transferring data associated with the referral I/O request from the first storage system and the second storage system.

Method 600 may further include steps of directing referral I/O requests to the plurality of storage systems of the block storage cluster based upon the referral response for transferring data to or transferring data from the plurality of storage systems of the block storage cluster; and transferring data associated with the referral I/O request to or transferring data associated with the referral I/O request from the plurality of storage systems of the block storage cluster. Method 600 may also include directing in parallel a plurality of sets of referral I/O request operations to the plurality of storage systems of the block storage cluster for transferring data to or transferring data from the plurality of storage systems of the block storage cluster.

Method 600 may further include a step of referencing, in the referral response, data associated with the first I/O request which is accessible by the first storage system.

Step 620 of method 600 may include transferring data associated with the first I/O request to or from a first storage system included in a plurality of storage systems of the block storage cluster when data associated with the first I/O request is accessible entirely by the first storage device. Step 620 may also include sending a referral response including a check condition from a first storage system included in a plurality of storage systems of the block storage cluster to the initiator in response to the first I/O request when data associated with the first I/O request is stored in more than one storage system of the plurality of storage systems of the block storage cluster, the check condition including sense data which contain a list of ports where data associated with the first I/O request resides. Step 620 may further include sending an immediate referral response from a first storage system included in a plurality of storage systems of the block storage cluster to the initiator system when data associated with the first I/O request is stored in more than one storage system of the plurality of storage systems of the block storage cluster.

It is to be noted that the foregoing described embodiments according to the present disclosure may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present disclosure may be conveniently implemented in forms of a software package. Such a software package may be a computer program product which employs a non-transitory computer-readable storage medium including stored computer code which is used to program a computer to perform the disclosed function and process of the present disclosure. The non-transitory computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for communication between an initiator system and a block storage cluster, comprising:
   receiving a first input/output (I/O) request from the initiator system, the first I/O request associating data for transfer to or transfer from a storage location;
   sending an immediate referral response from a first storage system included in a plurality of storage systems of the block storage cluster to the initiator system when data associated with the first I/O request is stored in more than one storage system of the plurality of storage systems of the block storage cluster, the immediate referral response providing information for directing the initiator system to a second storage system storing data associated with the first I/O request, the second storage system included in the plurality of storage systems of the block storage cluster;
   directing a referral I/O request to the first storage system and the second storage system for transferring data to or transferring data from the first storage system and the second storage system;
   transferring data associated with the referral I/O request to or transferring data associated with the referral I/O request from the first storage system and the second storage system;
   directing in parallel a plurality of sets of referral I/O request operations to the plurality of storage systems of the block storage cluster based upon the immediate referral response for transferring data to or transferring data from the plurality of storage systems of the block storage cluster; and
   transferring data associated with the plurality of sets of referral I/O requests to or transferring data associated with the plurality of sets of referral I/O requests from the plurality of storage systems of the block storage cluster,
   wherein the immediate referral response includes a check condition from the first storage system included in the plurality of storage systems of the block storage cluster to the initiator in response to the first I/O request when data associated with the first I/O request is stored in more than one storage system of the plurality of storage systems of the block storage cluster, the check condition including sense data which contains a list of ports where data associated with the first I/O request resides.

2. The method of claim 1, further including:
   referencing, in the immediate referral response, data associated with the first I/O request which is accessible by the first storage system.

3. The method of claim 1, wherein the first I/O request is a Small Computer System Interface (SCSI) command, the referral I/O request is a Small Computer System Interface (SCSI) command, the first storage system is a SCSI storage system, and the initiator system is a SCSI initiator system.

4. A storage system, comprising:
   means for receiving a first input/output (I/O) request from an initiator system, the first I/O request associating data for transfer to or transfer from a storage location;
   means for sending an immediate referral response from a first storage system included in a plurality of storage systems of a block storage cluster to the initiator system when data associated with the first I/O request is stored in more than one storage system of the plurality of storage systems of the block storage cluster, the immediate referral response providing information for directing the initiator system to a second storage system storing data associated with the first I/O request, the second storage system included in the plurality of storage systems of the block storage cluster;
   means for directing a referral I/O request to the first storage system and the second storage system for transferring data to or transferring data from the first storage system and the second storage system;
   means for transferring data associated with the referral I/O request to or transferring data associated with the referral I/O request from the first storage system and the second storage system;
   means for directing in parallel a plurality of sets of referral I/O request operations to the plurality of storage systems of the block storage cluster for transferring data to or transferring data from the plurality of storage systems of the block storage cluster; and
   means for transferring data associated with the referral I/O requests to or transferring data associated with the referral I/O requests from the plurality of storage systems of the block storage cluster,
   wherein the immediate referral response includes a check condition from the first storage system included in the plurality of storage systems of the block storage cluster to the initiator in response to the first I/O request when data associated with the first I/O request is stored in more than one storage system of the plurality of storage systems of the block storage cluster, the check condition including sense data which contains a list of ports where data associated with the first I/O request resides.

5. The system of claim 4, further including:
   means for referencing, in the immediate referral response, data associated with the first I/O request which is accessible by the first storage system.

6. The system of claim 4, wherein the first I/O request is a Small Computer System Interface (SCSI) command, the referral I/O request is a Small Computer System Interface (SCSI) command, the first storage system is a SCSI storage system, and the initiator system is a SCSI initiator system.

7. A non-transitory computer-readable medium having computer-executable instructions for performing a method for communication between an initiator system and a block storage cluster, the method comprising:

receiving a first input/output (I/O) request from the initiator system, the first I/O request associating data for transfer to or transfer from a storage location;

sending an immediate referral response from a first storage system included in a plurality of storage systems of the block storage cluster to the initiator system when data associated with the first I/O request is stored in more than one storage system of the plurality of storage systems of the block storage cluster, the immediate referral response providing information for directing the initiator system to a second storage system storing data associated with the first I/O request, the second storage system included in the plurality of storage systems of the block storage cluster;

directing a referral I/O request to the first storage system and the second storage system for transferring data to or transferring data from the first storage system and the second storage system;

transferring data associated with the referral I/O request to or transferring data associated with the referral I/O request from the first storage system and the second storage system;

directing in parallel a plurality of sets of referral I/O request operations to the plurality of storage systems of the block storage cluster based upon the referral response for transferring data to or transferring data from the plurality of storage systems of the block storage cluster; and transferring data associated with the plurality of sets of referral I/O requests to or transferring data associated with the plurality of sets of referral I/O requests from the plurality of storage systems of the block storage cluster, wherein the immediate referral response includes a check condition from the first storage system included in the plurality of storage systems of the block storage cluster to the initiator in response to the first I/O request when data associated with the first I/O request is stored in more than one storage system of the plurality of storage systems of the block storage cluster, the check condition including sense data which contains a list of ports where data associated with the first I/O request resides.

8. The non-transitory computer-readable medium of claim 7, wherein the method further includes:

referencing, in the immediate referral response, data associated with the first I/O request which is accessible by the first storage system.

9. The non-transitory computer-readable medium of claim 7, wherein the first I/O request is a Small Computer System Interface (SCSI) command, the referral I/O request is a Small Computer System Interface (SCSI) command, the first storage system is a SCSI storage system, and the initiator system is a SCSI initiator system.

* * * * *